United States Patent [19]

Scholz

[11] 4,069,491
[45] Jan. 17, 1978

[54] TIMING MECHANISM FOR PHOTOGRAPHIC SHUTTERS

[75] Inventor: Erwin Scholz, Braunschweig, Germany

[73] Assignee: Rollei-Werke Franke & Heidecke, Braunschweig, Germany

[21] Appl. No.: 767,774

[22] Filed: Feb. 11, 1977

[30] Foreign Application Priority Data

Feb. 20, 1976 Germany ............................ 2606864

[51] Int. Cl.² .......................... G03B 9/62; G03B 17/40
[52] U.S. Cl. ..................................... 354/267; 354/260
[58] Field of Search .............. 354/246, 259, 260, 261, 354/262, 264, 265, 266, 267

[56] References Cited

U.S. PATENT DOCUMENTS 3,825,940   7/1974   Hayami ........................... 354/246 X Primary Examiner—L. T. Hix
Assistant Examiner—M. L. Gellner
Attorney, Agent, or Firm—Stonebraker, Shepard & Stephens

[57] ABSTRACT

Timing mechanism for timing an adjustable and controlled interval between commencement of movement of two light obstructing elements of a photographic shutter, such as commencement of movement of an opening blade or curtain, and subsequent commencement of movement of a closing blade or curtain. A cam operatively connected to the first element starts to move upon the movement of that element, and controls the movement of a first pivoted lever. There is a second pivoted lever spaced from the first pivoted lever and adapted to be moved from the movement of the first lever, through an intermediate adjusting member which is moved by the movement of the first lever and which, in turn, causes movement of the second lever. For adjusting the time interval, the adjusting member is movable toward or away from the fulcrum of the first lever, and simultaneously away from or toward the fulcrum of the second lever, thereby varying the transmission ratio from one lever to the other. Predetermined movement of the second lever releases a release member, whereupon movement of the second or trailing shutter element commences. Provision is made for moving the second lever to an inoperative position, whenever it is desired to control the time interval automatically by electronic means, rather than by the mechanical lever system. The invention is particularly useful in connection with shutters of the focal plane type.

12 Claims, 5 Drawing Figures

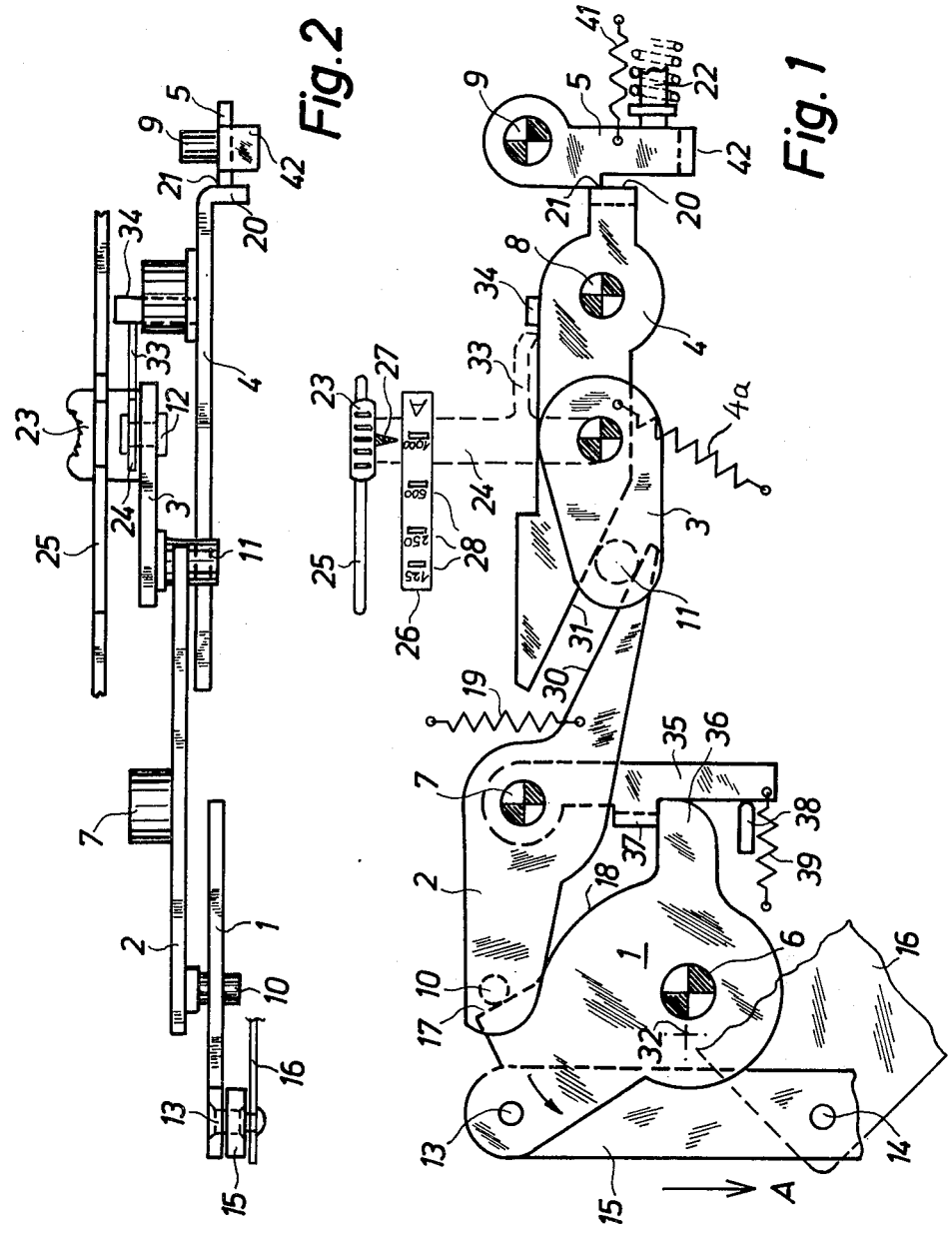

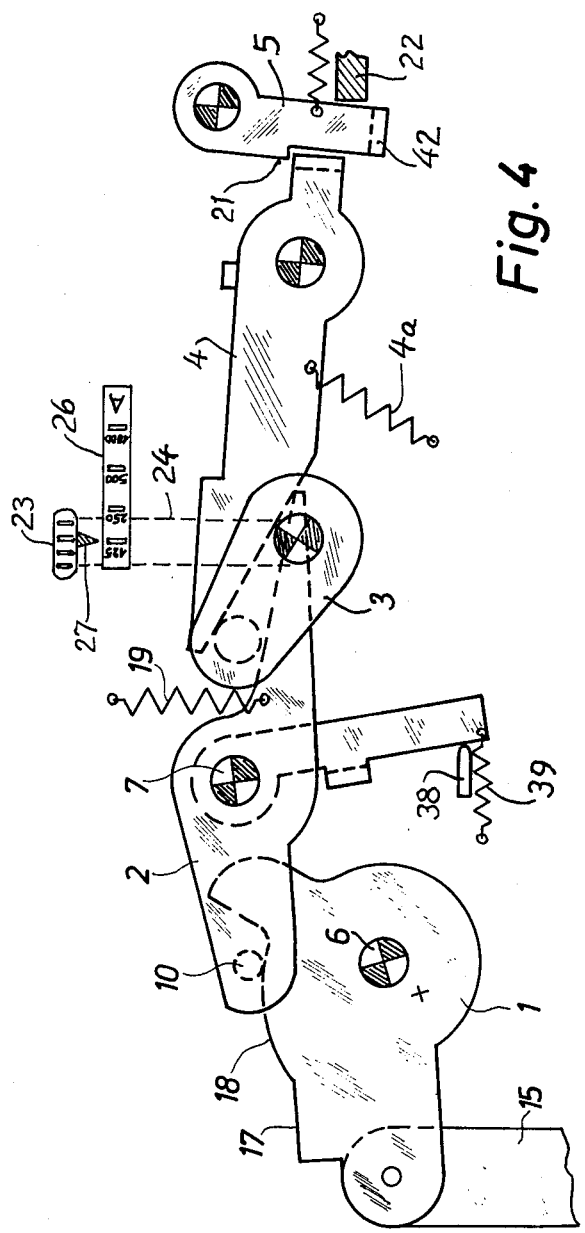

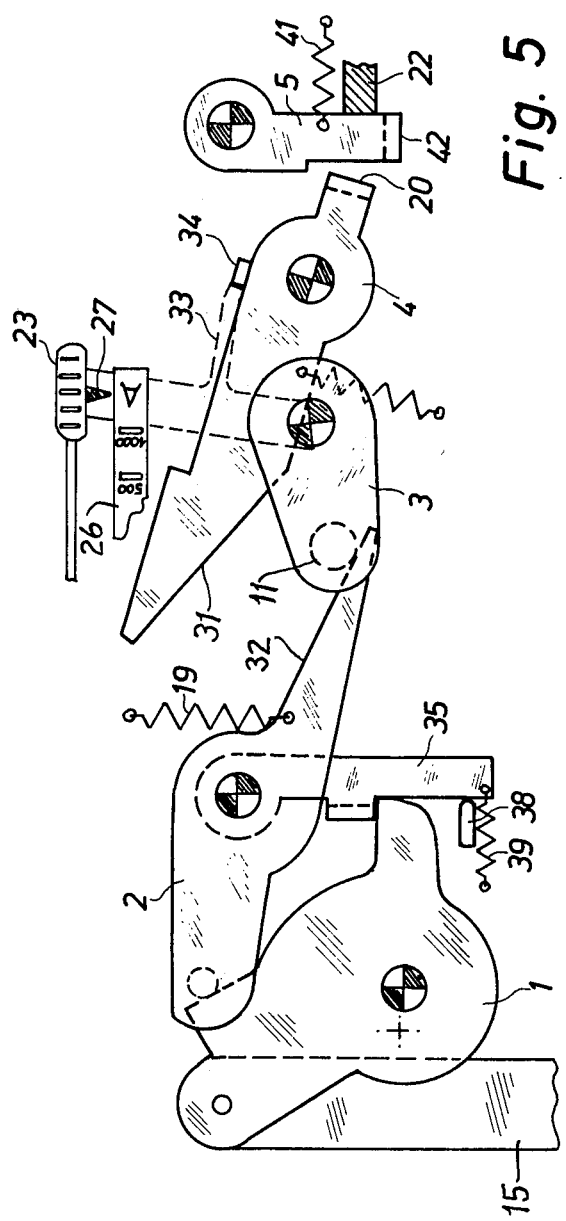

TIMING MECHANISM FOR PHOTOGRAPHIC SHUTTERS

BACKGROUND OF THE INVENTION

In certain known types of photographic shutters, one or more light obstructing elements, such as blades or curtain members, move initially to an open position to admit light through the exposure opening, followed shortly thereafter by movement of one or more other light obstructing elements, such as blades or curtains, from an open position to a closed position, to terminate the exposure. This is particularly true in shutters of the so-called focal plane type, although occasionally two sets of elements are encountered in shutters of the objective type as distinguished from the focal plane type. The present invention deals particularly with the timing of the interval between commencement of movement of the first element (or group of elements) which may be called the opening or leading element, and the commencement of movement of the second element (or group of elements) which may be called the closing or trailing element. The present invention is particularly suitable for use in shutters of the focal plane type although some features of the invention may be useful also in shutters of the objective type, since the invention relates basically to the timing of the exposure interval, rather than to any details of construction of the opening or leading element and the closing or trailing element, which details may be conventional and are unimportant so far as the present invention is concerned.

As well understood in the art, the light obstructing means which moves to open the exposure aperture of the camera may be a single element or a group or set of two or more elements, which merely for convenience may be referred to in the singular as an element, intending thereby to include the plural. Likewise the other or trailing light obstructing means, initially open and moved to terminate the exposure, may similarly be constructed as a single element or a plurality of elements, and again the singular expression element is intended to include the plural. Each element may also be referred to as an blade or a curtain. The time interval between the commencement of movement of the opening or leading element and the commencement of movement of the closing or trailing element determines the length or duration of the exposure, and also determines the width of the so-called slit in the case of a focal plane shutter. It is the control mechanism for determining this time interval which forms the subject matter of the present invention. As already indicated, details of construction of the light obstructing elements or blades themselves, and other details of the camera, are not important for purposes of the present invention and may be widely varied within the skill of the art.

The present invention deals particularly with timing mechanism of mechanical construction for timing the start of the closing movement of the second light obstructing element, with relation to the time of start of opening movement of the first light obstructing element.

An object of the invention is the provision of a simplified and improved form of mechanical timing mechanism (as distinguished from the electrical or electronic timing mechanism) which will operate smoothly, efficiently, and reliably without causing undesirable jolts or vibrations.

Another object is the provision so designed that it is relatively compact and space-saving, requiring little room in the camera.

Still another object is the provision of such mechanical timing mechanism in a form suitable for use in a camera having provision for timing the shutter both mechanically and electronically, the mechanical timing mechanism being so constructed that it may be rendered inoperative in an easy manner, when it is desired to set the camera for electronic timing rather than mechanical timing.

SUMMARY OF THE INVENTION

A control cam is operatively connected to the opening or leading light obstructing element of the shutter, to move therewith. The second or trailing light obstructing element is held against movement by a releasable latch or release pawl. An operative lever train is interposed between the cam and the release pawl, this lever train having its own spring power so that it does not have to take any power from or offer any resistance to the running down movement of the first light obstructing element or its connected cam. The lever train includes a first pivoted lever which is a feeler or sensor lever responsive to the movement of the cam, which lever has an arm extending in a general direction from its fulcrum toward the fulcrum of the second lever. The secomd lever has an arm extending in a general direction toward the fulcrum of the first lever, there being a space between these two arms. An adjustable transmission element lies in the space between these two arms of these two levers, and is movable along such space, in a direction closer to the fulcrum of the first lever and simultaneously farther from the fulcrum of the second lever, or reversely in a direction farther from the fulcrum of the first lever and simultaneously closer to the fulcrum of the second lever.

When the first transmission lever moves in response to the movement of the cam, its movement presses against and moves the transmission member which in turn causes movement of the second lever, and after a certain degree of movement of the second lever, an arm on the second lever slips past a shoulder on the latch or release pawl, allowing this pawl to move so as to release the second or trailing light obstructing element so that such element may begin its movement. By adjusting the position of the interposed adjustable transmission member between the arm of the first lever and the arm of the second lever, the leverage ratio of the first lever relative to the second lever is altered, so that a greater or lesser extent of pivotal movement of the first lever is sufficient to move the second lever enough to release the pawl which controls the trailing movement of the shutter. In this way the time interval from the commencement of movement of the first or leading element to the commencement of movement of the second or trailing element can be altered. When the shutter is to be timed electronically rather than by this mechanical lever train, the second lever of the lever train is moved to an inoperative position where it no longer obstructs or controls the release pawl of the second or trailing shutter element.

BRIEF DESCRIPTION OF THE DRAWINGS

FIG. 1 is a somewhat diagrammatic plan view of timing mechanism in accordance with a preferred embodiment of the invention, showing the parts in normal initial position, with both the leading or opening element and the trailing or closing element in their tensioned or cocked positions ready for making an exposure;

FIG. 2 is a size elevational view of the parts shown in FIG. 1;

FIG. 4 is a similar view of the parts in an intermediate position when the shutter is set for the slowest mechanically timed speed of 1/125th of a second; and FIG. 5 is a similar view with the shutter set for automatic operation with electronic control of the exposure time, the mechanical timing mechanism being in an inoperative position.

DESCRIPTION OF THE PREFERRED EMBODIMENT

Figure 3:
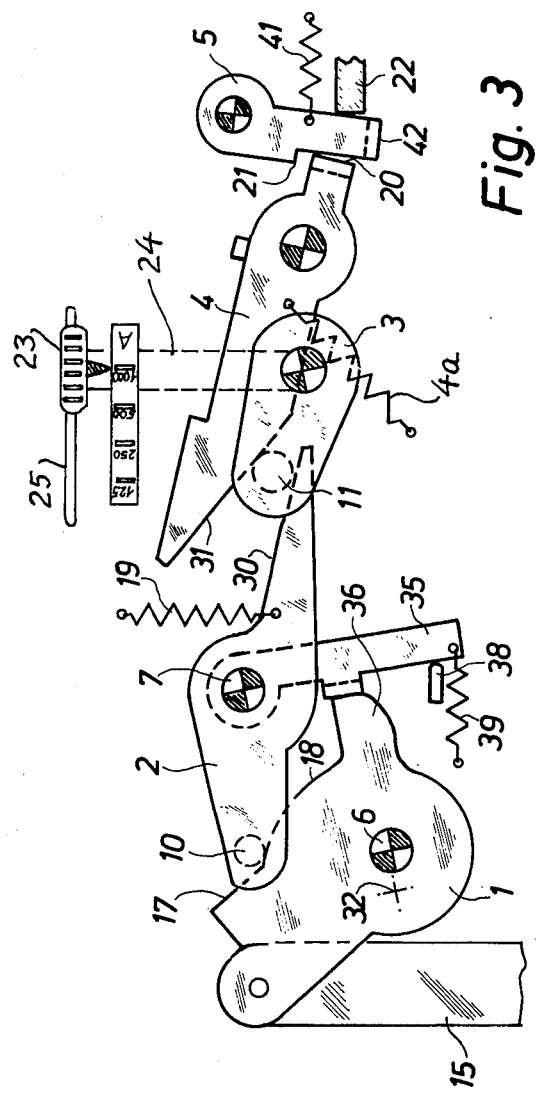
FIG. 3 is a view similar to FIG. 1 showing the parts at an intermediate stage of the running down movement, where the leading element has been unlatched and has started its opening movement and the trailing element has also been unlatched to start its closing movement, the shutter being set for the fastest mechanical speed of 1/1000th of a second.

The first or leading light obstructing member or blade or curtain is indicated schematically at 16. In the tensioned position of the shutter, ready for making an exposure, the element 16 (or a series of such elements, if more than one are used, as above explained) obstructs the passage of light through the exposure aperture of the camera, toward the film, and spring means (not shown) tends to move the element 16 downwardly in the direction of the arrow A in FIG. 1, to uncover the exposure aperture so that light may reach the film. The opening movement of the element 16 is prevented, until the proper time, by the control disk or control cam 1, operatively connected to the shutter element 16 by a link 15 pivoted to the control disk at 13 and pivoted to the shutter element at 14.

The control disk is held in the position illustrated in FIG. 1 by means of a pivoted latch member 35, which may be called the starting pawl, and which has an ear 37 overlying an arm 36 on the control disk. The camera release member 38 is moved rightwardly, when viewed as in FIG. 1, when the operator desires to make an exposure. This moves the lower end of the starting pawl 35 rightwardly, swinging the pawl in a counterclockwise direction on its pivot, against the force of its spring 39 which tends to keep it engaged. When the latch 35 has moved far enough to the right, the lug or ear 37 passes to a point beyond the end of the arm 36, and the control disk 1 may then begin to turn in a counterclockwise direction on its fixed pivot 6, under the influence of the spring means which tends to move the shutter element 16 downwardly in an opening direction, to admit light to the film.

Shortly thereafter, the closing or trailing light obstructing element of the shutter starts it movement to close the exposure aperture and stop the passage of light to the film. The trailing element of the shutter may be of conventional form, and is not illustrated. It is sufficient to say that its movement is controlled by the release pawl 5 swingable on its fixed pivot 9. When the release pawl or latch 5 is in the position shown in FIG. 1, the closing or trailing element of the shutter is held in its initial tensioned position, in non-obstructing relation to passage of light through the exposure aperture. When the release pawl 5 swings slightly clockwise from the position shown in FIG. 1, this releases the closing or trailing element of the shutter so that such element may commence its closing movement under the power of its own spring, well known in the art but not shown here. In a shutter of the focal plane type, the distance between the trailing edge of the leading element and the leading edge of the trailing element constitutes the slit through which light reaches the film as this slit sweeps across the exposure area of the film, just in front of the film. This is well understood, of course, by those skilled in the art.

The motion of the trailing element, the start of which is controlled by the release pawl 5, must be accurately timed with respect to the commencement of motion of the leading element, controlled by the starting pawl 35. The control must not only be accurate, but also be variable or adjustable, in order to be able to obtain different durations of exposure. It is this control or timing of the release of the second or trailing element with respect to the motion of the first or leading element which constitutes the subject matter of the invention, as already indicated above.

In many shutters of the prior art, the first or leading element of the shutter, or some part connected to and moving therewith, during its running down movement engages the release pawl of the second or trailing element and actuates the release pawl. This arrangement is not satisfactory, however, for two reasons. First, the striking of the moving part associated with the first shutter element against the release pawl creates a vibration which is undesirable. Second, the striking of one part against the other and the thrusting aside of the release pawl constitutes an impediment to the smooth motion of the first shutter element and absorbs some of the power which should be used to provide speedy movement of the shutter element, particularly when making fast exposures of short duration.

These drawbacks are overcome by the timing mechanism of the present invention, where there is no striking of one part against another, and where the actuation of the release pawl for the second shutter element is accomplished by a separate power spring of the timing mechanism, and does not absorb or detract in any way from the use of the power spring of the first shutter element exclusively in moving that element.

The train of connections from the control disk 1 of the first shutter element to the release pawl 5 of the second shutter element comprises a first lever 2 which may be called the sensor lever or feeler lever, mounted on a stationary pivot or fulcrum 7, and a second lever 4 which may be called the release lever, mounted on a stationary fulcrum or pivot 8, and an adjusting member 3 carrying a transmission member 11 for transmitting force from the first lever 2 to the second lever 4.

One arm of the lever 2 (the left hand arm when viewed as in FIG. 1) carries a pin 10 which rides on the periphery of a cam portion on the control disk 1. A spring 19 tends to move the lever 2 in a counterclockwise direction, keeping the pin 10 against the cam. The other or right hand arm of the lever 2 extends in a general direction toward the pivot 8 of the second lever 4, and has a straight surface 30 which, in the rest position of the parts (as shown in FIG. 1) lies parallel to and spaced from a similar straight surface 31 on the left hand arm of the second lever 4, which left hand arm extends in a general direction toward the pivot 7 of the first lever 2. A sprng 4a attached to the lever 4 tends to turn this lever counterclockwise on its pivot 8, to keep the surface 31 of the lever pressed against the transmission member 11 which lies snugly between the surfaces 30 and 31. The right hand arm of the second lever 4 is relatively short and terminates in an ear or lug 20 which, in the rest position of the parts, makes contact with a surface 21 on the release pawl 5, restraining this release pawl against clockwise movement from its rest or latching position.

An electromagnet (not shown) has an armature, part of which is indicated at 22. This armature is surrounded by a spring 22a which tends to move the armature leftwardly (when viewed as in FIG. 1) to cause it to press leftwardly against the release pawl 5 to tent to swing this pawl in a clockwise direction, if current is not flowing through the associated electromagnet. When current is flowing through the electromagnet, it holds the armature so that it cannot move leftwardly. A light spring 41 tends to keep the release pawl 5 against the end of the armature. The spring 22a is stronger than the spring 41 and overcomes the spring 41, moving the release pawl 5 clockwise if no current is flowing in the electromagnet and if the lever 4 is moved to its unlatching position. When the release pawl 5 does move clockwise, the latching ear or lug 42 thereon releases an appropriate part of the second or trailing light obstructing element of the shutter, so that such element make commence its running down movement.

The cam surface on the control disk 1, for engagement with the feeler pin 10 on the lever 2, has a first portion 17 of straight or linear shape, followed by an arcuate portion 18 which is an arc struck about the point 32 as a center, this point 32 being offset eccentrically with respect to the pivot 6 of the disk 1. With this shape of the cam, it is seen that when the disk 1 first begins to move counterclockwise, when first released by the starting pawl 35, the pin 10 will move quite rapidly toward the pivotal center of the disk 1 during the first part of such movement, as it slides down the straight or linear portion 17 of the cam, and then will move more slowly toward the center of the disk 1, as the pin 10 slides along the arcuate portion 18 of the cam during the continued counterclockwise movement of the disk 1. Thus the first part of the resulting movement of the lever 2 will be quite rapid, as is appropriate for timing exposures of very high speed and very short duration, and then will move more slowly as is appropriate for accurate timing of exposures of slower speed and longer duration.

The counterclockwise rotation of the first lever 2 will cause the surface 30 thereof to press upwardly on the transmission member 11, displacing this transmission member 11 and causing clockwise swinging of the adjusting member or lever arm 3 which carries the transmission member 11 and which is pivotally mounted on the pivot 12. This upward motion of the transmission member 11, in turn, will press upwardly on the surface 31 of the second lever 4, swinging this lever clockwise on its pivot 8 until the latching lug 20 thereof slides past the portion 21 of the release pawl 5. Thereupon, the spring 22a can move the armature 22 leftwardly (assuming that the shutter has been set for mechanical operation and that no current is flowing through the electromagnet) overcoming the lesser power of the spring 41, and moving the latching end 42 of the release pawl 5 to release an appropriate part (not shown) of the second or trailing light obstructing element of the shutter, so that the trailing element may begin its running down movement in timed relation to the movement of the first or leading element of the shutter.

In order to adjust the duration of the exposure, the transmission member 11 is movable to various positions along the length of the slot formed between the surface 30 on the first lever 2 and the surface 31 on the second lever 4. This is accomplished by providing a manually operable button or adjusting member 23 accessible on the exterior of the camera, and sliding along a slot 25, adjacent to a graduated scale 26 having graduations 28 indicating various lengths of exposure duration, often referred to as shutter speeds. The graduations here shown in the drawings as typical examples are marked 125, 250, 500, and 1000, meaning exposures having durations 1/125th, 1/250th, 1/500th, and 1/1000th of a second, as well as the graduation "A" indicating a setting for automatic operation rather than for manual selection of the shutter speed. By moving the knob 23 along the slot 25, a pointer 27 thereon can be brought opposite one or another of the graduations 28. A web or other suitable mechanical connection 24 exends from the manual setting knob 23 to the pivot of the adjusting member 3, so that as the manual member 23 is moved, it moves the transmission member 11 along the slot between the surfaces 30 and 31. FIGS. 1 and 3 show the position of this transmission member 11 when the timing mechanism is set for mechanical timing of an exposure of the shortest duration, 1/1000th of a second. Here, the transmission member 11 is near the extreme end of the arm of the lever 2, and relatively close to the pivot 8 of the lever 4. Hence the movement of the lever 2, starting when the pin 10 begins to slide down the linear part 17 of the cam of the disk 1, is magnified and produces a greater movement of the lever 4, quickly moving the part 20 thereof past the shoulder 21 of the release pawl 5, so that the release action takes place rapidly and the second or trailing shutter element begins to move after only a very brief time interval. This action is illustrated in FIG. 3.

By contrast, FIG. 4 illustrates the setting for the slowest of the mechanically timed exposures, the knob here being set for 1/125th of a second. In this position, the transmission member 11 is much closer to the fulcrum 7 of the first lever 2, and farther away from the fulcrum of the second lever 4. Hence it is necessary for the control disk 1 to turn to a considerably greater extent, before the lever 2 moves far enough to displace the lever 4 far enough to allow the release pawl 5 to make its clockwise movement to release the second or trailing element of the shutter. Intermediate positions of the adjusting knob 23, between that illustrated in FIG. 1 and that illustrated in FIG. 4, will produce corresponding intermediate positions of the transmission member 11 in the slot between the surfaces 30 and 31, and corresponding differences in the timing of release of the trailing shutter element in comparison to the movement of the leading shutter element.

This same mechanism is adapted for use in shutters which may be controlled selectively either mechanically or electronically. If the shutter is switched over to automatic operation, by moving the manual controller 23 to the position shown in FIG. 5, an arm 33 on the web 24 strikes against a lug 34 on the second lever 4 and swings this lever 4 clockwise to the position shown in FIG. 5, where it is ineffective to engage either the release pawl 5 or the transmission member 11. In this position, the lever 2 will go through its normal movement during the counterclockwise rotation of the control disk 1, but this movement will be ineffective so far as any timing of the shutter is concerned, and will not affect the position of the lever 4. During electronic operation, current flows through the electromagnet so that the armature 22 thereof is held against the force of its spring 22a, and thus the release pawl 5 is still held in latching position. At the proper moment, as controlled by the electronic circuit of known form, the current stops flowing through the electromagnet, and then the spring 22a of the armature causes this armature to move leftwardly, pressing against the release pawl 5 and moving it to an unlatching position so that the second shutter element can commence its running down movement.

It will be noted that the running down movement of the first shutter element and its associated control disk is not impeded in any way by the mechanical timing mechanism. On the contrary, the pressure of the feeler or follower pin 10 against the cam on the disk 1 tends to assist the turning of the disk in the countercockwise duration, rather than impeding the same. The operation of the mechanical timing mechanism is performed by its own power spring 19, without requiring any drain on the power of the main spring of the first light obstructing element 16 of the shutter. Also it will be noted that the action is very smooth and free from vibration, the pin 10 sliding smoothly along the first part 17 and then along the second or arcuate part 18 of the cam, without any abrupt changes and without any hitting or impact which might cause vibration. The invention thus provides an extremely efficient and smooth mechanical timing mechanism. It is also a very compact mechanism, as it can be seen from FIG. 2 that the parts lie relatively close to each other, occupying only a rather thin space.

What is claimed is:

1. Timing mechanism for timing the release of a trailing shutter element with relation to release of a leading shutter element, said mechanism comprising a control member movable in synchronism with a leadng shutter element, a movable release pawl for restraining movement of a trailing shutter element, and lever mechanism responsive to movement of said control member for releasing said release pawl for movement to a released position upon a variable selected extent of movement of said control member, said lever mechanism having its own separate driving power.

2. The invention defined in claim 1, wherein said lever mechanism comprises a sensor lever (2) swingable on a fixed pivot (7) in response to movement of said control member (1), and a release lever (4) swingable on a fixed pivot (8) in response to movement of said sensor lever, said release lever controlling movement of said release pawl (5).

3. The invention defined in claim 2, wherein said separate driving power comprises a spring (19) acting on said sensor lever.

4. The invention defined in claim 1, wherein said control member is mounted for rotary movement on a pivot (6) and includes a control cam having a straight portion (17) and an arcuate portion (18) having a center offset from said pivot (6), said lever mechanism including a feeler part engaging said control cam and moving progressively toward said pivot (6) as rotation of said control cam continues during a running down movement of said leading shutter element.

5. The invention defined in claim 2, wherein said lever mechanism includes an adjustable transmission member (11) moved by said sensor lever (2) and engaging said release lever (4) to cause movement of said release lever when said transmission member is moved by said sensor lever.

6. The invention defined in claim 5, further comprising means for varying the distance of said transmission member from the pivot of one of said levers, thereby to vary a transmission ratio from one lever to the other.

7. The invention defined in claim 5, wherein said transmission member (11) is mounted on an adjusting lever (3), a pivot (12) on which said adjusting lever is mounted, and handle means (23) operatively connected to said pivot for moving said pivot to vary the position of said adjusting lever and of said transmission member relative to said sensor lever and release lever.

8. The invention defined in claim 7, further comprising a shutter speed scale graduated to indicate exposure times, and means for moving said handle along said scale.

9. The invention defined in claim 2, wherein said release pawl (5) has a projection (21) and said release lever (4) has an ear (20) abutting said projection.

10. The invention defined in claim 9, further comprising manually operable adjusting means movable to a plurality of positions, and means operated by movement of said adjusting means to one of said positions for shifting said release lever (4) to a non-abutting position with respect to said release pawl (5).

11. The invention defined in claim 1, further comprising means for rendering said lever mechanism inoperative with respect to said release pawl, when said shutter is to be timed otherwise than by said lever mechanism.

12. The invention defined in claim 11, further comprising a shutter speed scale comprising a plurality of shutter speed graduations indicating shutter speeds selectively timed by said lever mechanism and a graduation indicating automatic timing of shutter speed, a manually operable setting member movable along said scale, and an arm connected to and movable by said manually operable setting member for engaging said lever mechanism to render said mechanism inoperative upon movement of said setting member to said automatic timing graduation of said scale.

* * * * *